US012593276B2

(12) United States Patent
Haider et al.

(10) Patent No.: US 12,593,276 B2
(45) Date of Patent: Mar. 31, 2026

(54) SYSTEMS AND METHOD FOR INDICATING SERVICE PERIOD INFORMATION FOR RESTRICTED TARGET WAKE TIME

(71) Applicant: Meta Platforms Technologies, LLC, Menlo Park, CA (US)

(72) Inventors: Muhammad Kumail Haider, Sunnyvale, CA (US); Chunyu Hu, Saratoga, CA (US); Binita Gupta, San Diego, CA (US); Chittabrata Ghosh, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 505 days.

(21) Appl. No.: 17/982,068

(22) Filed: Nov. 7, 2022

(65) Prior Publication Data

US 2023/0180127 A1      Jun. 8, 2023

Related U.S. Application Data

(60) Provisional application No. 63/286,753, filed on Dec. 7, 2021.

(51) Int. Cl.
*H04W 52/02*          (2009.01)

(52) U.S. Cl.
CPC ... *H04W 52/0216* (2013.01); *H04W 52/0235* (2013.01)

(58) Field of Classification Search
CPC ......... H04W 52/0216; H04W 52/0219; H04W 52/0229; H04W 52/0235; Y02D 30/70
See application file for complete search history.

(56) References Cited

U.S. PATENT DOCUMENTS

2014/0153512 A1*  6/2014  Koskela ................ H04L 1/1887
                                                      370/329
2019/0141631 A1   5/2019  Patil et al.
                  (Continued)

FOREIGN PATENT DOCUMENTS

EP          3142312 A1 *  3/2017  ........... H04B 10/038

OTHER PUBLICATIONS 802 11 Working Group of the LAN/MAN Standards Committee of the IEEE Computer Society: "IEEE P802.11ax(TM)/D5.1? Draft Standard for Information Technology-Tele-Communications and Information Exchange between Systems Local and Metropolitan Area Networks-Specific Requirements? ? Part 11: Wireless LAN Medium Access Control ? (MAC) and Physical Layer (PHY) Specifications? ? Amendment 1: E," IEEE Draft; Draft P802.11AX_D5.1, IEEE-SA, vol. 802.11ax drafts, No. D5.1 Nov. 6, 2019, pp. 1-770, XP068155342, Retrieved.
(Continued)

*Primary Examiner* — Phuc H Tran
(74) *Attorney, Agent, or Firm* — Foley & Lardner LLP

(57)          ABSTRACT

A device may generate a frame relating to a target wake time (TWT) schedule. In response to determining that the device cannot accept a request for a new membership of the TWT schedule, the device may set a subfield of the frame to a first value, indicating, to a receiver device receiving the frame, to avoid sending a request for a new membership of the TWT schedule. In response to determining that there is at least one wireless device having a membership of the TWT schedule, the device may set the subfield of the frame to a second value. In response to determining that there exists another TWT schedule set up for an overlapping basic service set (OBSS), the device may set the subfield of the frame to a fourth value. The device may wirelessly transmit the generated frame to the receiver device.

18 Claims, 8 Drawing Sheets

800

Generating, by one or more processors of a device, a frame relating to a target wake time (TWT) schedule 802

↓

Determining, by the one or more processors, whether the device can accept a request for a new membership of the TWT schedule 804

↓

In response to determining that the device cannot accept a request for a new membership of the TWT schedule, setting, by the one or more processors, a subfield of the frame to a first value, indicating, to a receiver device receiving the frame, to avoid sending a request for a new membership of the TWT schedule 806

↓

Wirelessly transmitting, via a transceiver, the generated frame to the receiver device 808

(56) References Cited

U.S. PATENT DOCUMENTS

| | | | | |
|---|---|---|---|---|
| 2019/0268846 A1* | 8/2019 | Xiao | ................. | H04W 52/0229 |
| 2020/0221381 A1* | 7/2020 | Homchaudhuri | ............................ | |
| | | | | H04W 52/0235 |
| 2021/0289516 A1* | 9/2021 | Lee | ................... | H04W 72/0453 |
| 2021/0360646 A1* | 11/2021 | Chu | .................... | H04W 72/569 |
| 2022/0061047 A1* | 2/2022 | Hu | ....................... | H04L 5/0082 |
| 2023/0140312 A1* | 5/2023 | Ajami | .................. | H04W 76/28 |
| | | | | 370/329 |
| 2023/0156687 A1* | 5/2023 | Xia | .................. | H04W 74/0816 |
| | | | | 370/329 |

OTHER PUBLICATIONS

International Preliminary Report on Patentability for International Application No. PCT/US2022/051816, mailed Jun. 20, 2024, 9 pages.
International Preliminary Report on Patentability for International Application No. PCT/US2022/051752, mailed Jun. 20, 2024, 9 pages.
International Search Report and Written Opinion for International Application No. PCT/US2022/051752, mailed Mar. 17, 2023, 9 pages.
Mehta S., et al., "Improved Prediction of Software Defects using Ensemble Machine Learning Techniques," Neural Computing and Applications, vol. 33, No. 16, Mar. 2, 2021, 12 pages.

* cited by examiner

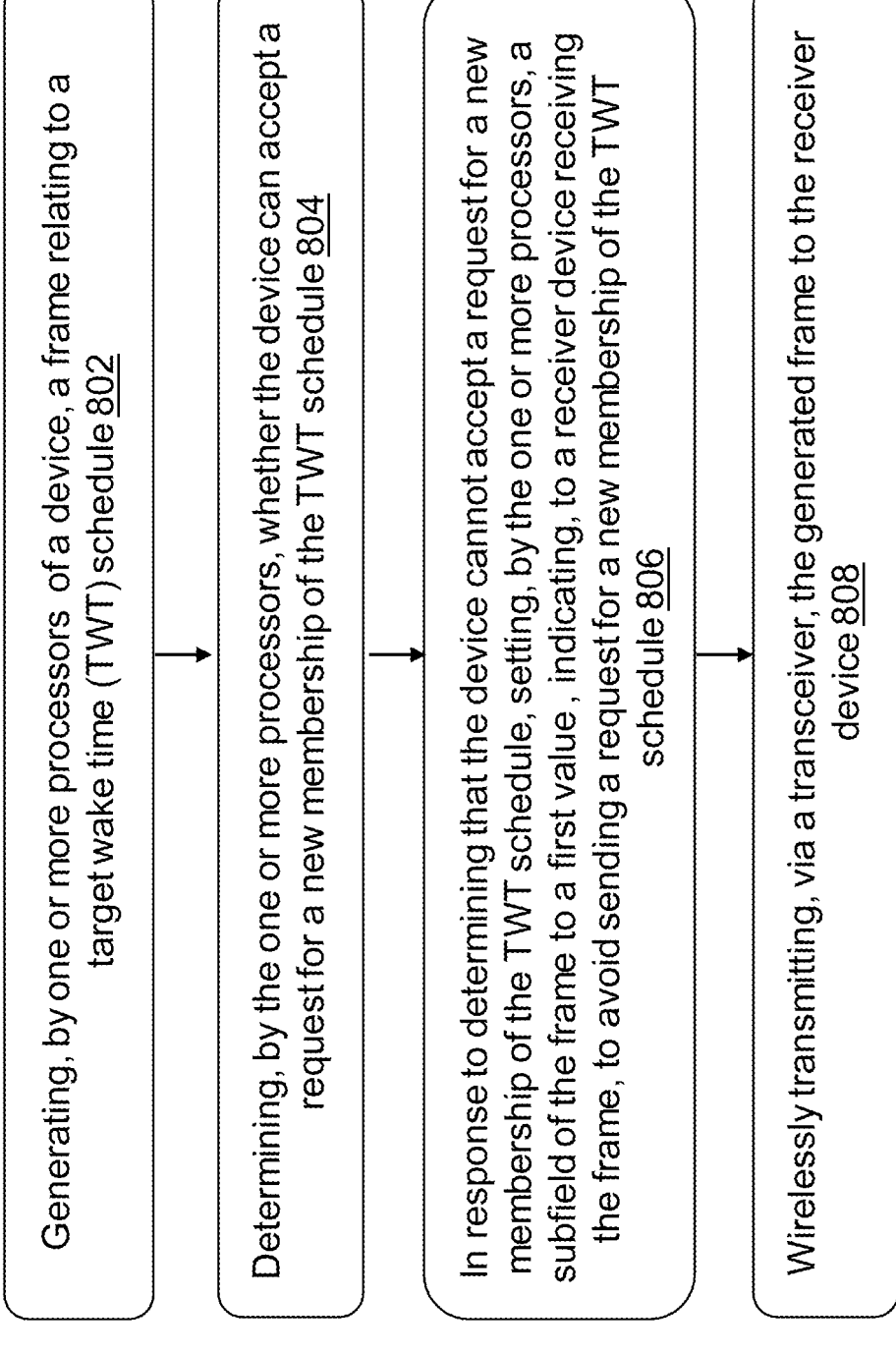

800

Generating, by one or more processors of a device, a frame relating to a target wake time (TWT) schedule 802

Determining, by the one or more processors, whether the device can accept a request for a new membership of the TWT schedule 804

In response to determining that the device cannot accept a request for a new membership of the TWT schedule, setting, by the one or more processors, a subfield of the frame to a first value, indicating, to a receiver device receiving the frame, to avoid sending a request for a new membership of the TWT schedule 806

Wirelessly transmitting, via a transceiver, the generated frame to the receiver device 808

FIG. 8

SYSTEMS AND METHOD FOR INDICATING SERVICE PERIOD INFORMATION FOR RESTRICTED TARGET WAKE TIME

CROSS-REFERENCE TO RELATED APPLICATION

This application claims priority to U.S. Provisional Patent Application No. 63/286,753 filed on Dec. 7, 2021, which is incorporated by reference herein in its entirety for all purposes.

FIELD OF DISCLOSURE

The present disclosure is generally related to communications, including but not limited systems and methods of indicating service period information for restricted target wake time (TWT) operations for wireless communication.

BACKGROUND

Artificial reality, such as a virtual reality (VR), an augmented reality (AR), or a mixed reality (MR), provides immersive experience to a user. In one example, a user wearing a head wearable display (HWD) can turn the user's head to one side, and an image of a virtual object corresponding to a location and/or an orientation of the HWD and a gaze direction of the user can be displayed on the HWD to allow the user to feel as if the user is moving within a space of an artificial reality (e.g., a VR space, an AR space, or a MR space). An image of a virtual object may be generated by a computing device communicatively coupled to the HWD. In some embodiments, the computing device may have access to a network.

SUMMARY

Various embodiments disclosed herein are related to a device including one or more processors. In some embodiments, the one or more processors may be configured to generate a frame relating to a target wake time (TWT) schedule. The one or more processors may be configured to determine whether the device can accept a request for a new membership of the TWT schedule. In response to determining that the device cannot accept a request for a new membership of the TWT schedule, the one or more processors may be configured to set a subfield of the frame to a first value, indicating, to a receiver device receiving the frame, to avoid sending a request for a new membership of the TWT schedule. The one or more processors may be configured to wirelessly transmit, via a transmitter, the generated frame to the receiver device.

In some embodiments, the TWT schedule may be a restricted TWT (R-TWT) schedule. In some embodiments, the receiver device receiving the frame may be in the same basic service set (BSS) as the device.

In some embodiments, the one or more processors may be configured to determine whether the device can allocate one or more resources for a new membership of the TWT schedule. In response to determining that the device cannot allocate one or more resources for a new membership of the TWT schedule, the one or more processors may be configured to determine that the device cannot accept a request for a new membership of the TWT schedule.

In some embodiments, the one or more processors may be configured to determine whether the device can accept a request for increasing a duration of a service period (SP) of the TWT schedule. In response to determining that the device cannot accept a request for increasing the duration of the SP of the TWT schedule, the one or more processors may be configured to set the subfield of the frame to the first value, indicating, to the receiver device receiving the frame, to avoid sending a request for increasing the duration of the SP of the TWT schedule.

In some embodiments, the one or more processors may be configured to determine whether there is at least one wireless device having a membership of the TWT schedule. In response to determining that there is at least one wireless device having a membership of the TWT schedule, the one or more processors may be configured to set the subfield of the frame to a second value, indicating, to the receiver device receiving the frame, to end a Transmit Opportunity (TXOP) duration before a start time of a service period (SP) of the TWT schedule. In response to determining that there is no wireless device having a membership of the TWT schedule, the one or more processors may be configured to set the subfield of the frame to a third value.

In some embodiments, the one or more processors may be configured to determine whether there exists another TWT schedule set up for an overlapping basic service set (OBSS) which is different from a BSS of the device. In response to determining that there exists another TWT schedule set up for the OBSS, the one or more processors may be configured to set the subfield of the frame to a fourth value, indicating, to the receiver device receiving the frame, to end a Transmit Opportunity (TXOP) duration before a start time of a service period (SP) of the another TWT schedule. There may be at least one wireless device having a membership of the another TWT schedule. In response to determining that there exists another TWT schedule set up for the OBSS, the one or more processors may be configured to set another subfield of the frame to an identifier of the OBSS.

Various embodiments disclosed herein are related to a method including generating, by one or more processors of a device, a frame relating to a target wake time (TWT) schedule. The method may include determining, by the one or more processors, whether the device can accept a request for a new membership of the TWT schedule. The method may include in response to determining that the device cannot accept a request for a new membership of the TWT schedule, setting, by the one or more processors, a subfield of the frame to a first value, indicating, to a receiver device receiving the frame, to avoid sending a request for a new membership of the TWT schedule. The method may include wirelessly transmitting, via a transmitter, the generated frame to the receiver device.

In some embodiments, the TWT schedule may be a restricted TWT (R-TWT) schedule. In some embodiments, the receiver device receiving the frame may be in same basic service set (BSS) as the device.

In some embodiments, the device may determine whether the device can allocate one or more resources for a new membership of the TWT schedule. In response to determining that the device cannot allocate one or more resources for a new membership of the TWT schedule, the device may determine that the device cannot accept a request for a new membership of the TWT schedule.

In some embodiments, the device may determine whether the device can accept a request for increasing a duration of a service period (SP) of the TWT schedule. In response to determining that the device cannot accept a request for increasing the duration of the SP of the TWT schedule, the device may set the subfield of the frame to the first value, indicating, to the receiver device receiving the frame, to avoid sending a request for increasing the duration of the SP of the TWT schedule.

In some embodiments, the device may determine whether there is at least one wireless device having a membership of the TWT schedule. In response to determining that there is at least one wireless device having a membership of the TWT schedule, the device may set the subfield of the frame to a second value, indicating, to the receiver device receiving the frame, to end a Transmit Opportunity (TXOP) duration before a start time of a service period (SP) of the TWT schedule. In response to determining that there is no wireless device having a membership of the TWT schedule, the device may set the subfield of the frame to a third value.

In some embodiments, the device may determine whether there exists another TWT schedule set up for an overlapping basic service set (OBSS) which is different from a BSS of the device. In response to determining that there exists another TWT schedule set up for the OBSS, the device may set the subfield of the frame to a fourth value, indicating, to the receiver device receiving the frame, to end a Transmit Opportunity (TXOP) duration before a start time of a service period (SP) of the another TWT schedule. There may be at least one wireless device having a membership of the another TWT schedule. In response to determining that there exists another TWT schedule set up for the OBSS, the device may set another subfield of the frame to an identifier of the OBSS.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 8 is a flowchart showing a process of indicating service period (SP) information for R-TWT operation for wireless communication, according to an example implementation of the present disclosure.

DETAILED DESCRIPTION

Figure 1:
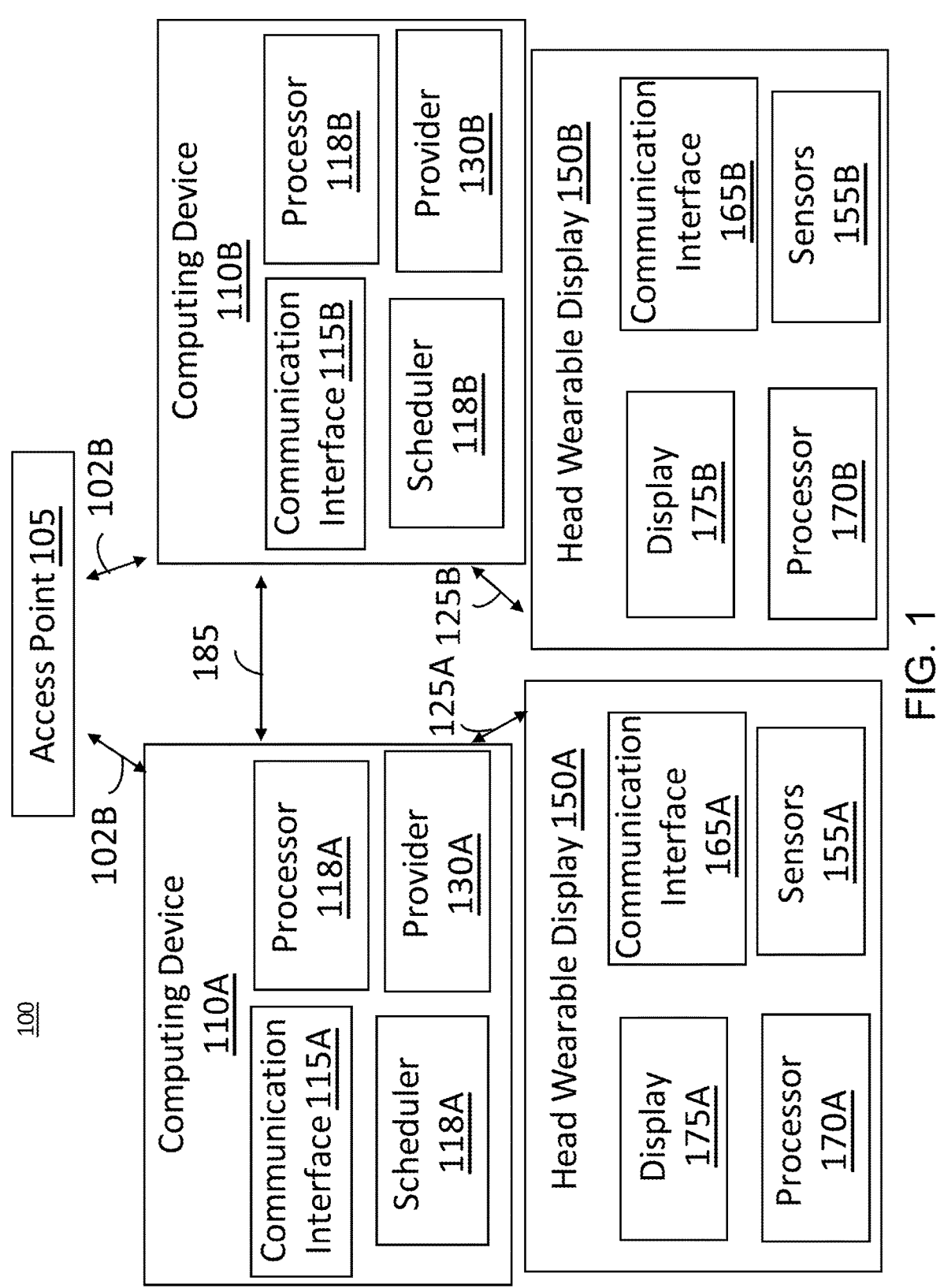
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable or characterized, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

TWT can be a time agreed/negotiated upon by devices (e.g., access points (APs) and/or stations (STAs)), or specified/configured by one device (e.g., an AP). During the wake time, a first device (e.g., a STA) may be in an awake state (e.g., its wireless communication module/interface is in a fully powered-up ready, or wake state) and is able to transmit and/or receive. When the first device is not awake (e.g., its wireless communication module/interface is in a powered-down, low power, or sleep state), the first device may enter a low power mode or other sleep mode. The first device may exist in the sleep state until a time instance/window as specified by the TWT.

TWT is a mechanism where a set of service periods (SPs) are defined and shared between devices to reduce medium contention and improve the power efficiency of the devices. For example, the first device can wake up periodically (e.g., at a fixed, configured time interval/period/cycle) based on the TWT. The TWT reduces energy consumption of the devices by limiting the awake time and associated power consumption of the devices.

An AP (e.g., AP and/or other device operating as a soft AP/hotspot) may enhance medium access protection and resource reservation by supporting restricted TWT (R-TWT). The R-TWT SPs may be used to deliver latency sensitive traffic and/or any additional frame that supports latency sensitive traffic.

Latency sensitive traffic that is not prioritized (or protected) may degrade a user experience. For example, in an AR context, latency between a movement of a user wearing an AR device and an image corresponding to the user movement and displayed to the user using the AR device may cause judder, resulting in motion sickness.

In one implementation, an image of a virtual object is generated by a remote computing device communicatively coupled to the HWD, and the image is rendered by the HWD to conserve computational resources and/or achieve bandwidth efficiency. In one example, the HWD includes various sensors that detect a location and/or orientation of the HWD and a gaze direction of the user wearing the HWD, and transmits sensor measurements indicating the detected location and gaze direction to a console device (and/or a remote server, e.g., in the cloud) through a wired connection or a wireless connection. The console device can determine a user's view of the space of the artificial reality according to the sensor measurements, and generate an image of the space of the artificial reality corresponding to the user's view. The console device can transmit the generated image to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

Disclosed herein includes systems, devices and methods for configuring a legacy/existing/specific communication system or device to support or conform to R-TWT operations using service period information. In one aspect, certain devices may communicate according to R-TWT operations to prioritize and/or reserve time periods for latency sensitive traffic. Meanwhile, legacy systems or devices that do not support R-TWT operations may attempt to access the channel during the reserved time periods, and can interfere with the latency sensitive traffic.

In one aspect, one or more access points and station devices, for example conforming to Wi-Fi standard may implement capability fields to protect R-TWT operations (e.g., to protect R-TWT service periods). In one approach, a device (e.g., access point or station device) can transmit (a message with) an R-TWT operation support field that indicates whether the device can support R-TWT operations. The R-TWT operation support field may be set in an extreme high throughput (EHT) capability field. If two devices (e.g., access point and station device) can support R-TWT operations, then the two devices may operate according to R-TWT operations (e.g., according to R-TWT access rules).

In one approach, a device (e.g., access point or station device) that may or may not support R-TWT operation (e.g., corresponding to its "Restricted TWT Operation Support" field) may specify (e.g., by transmitting a frame with) a restricted-TWT start time protection (RSTP) support capability field that indicates whether the device can support start time (window) protection (e.g., support access rules for protection of a service period (SP) reserved for or restricted to latency-sensitive traffic). The RSTP support capability field may be set in an EHT capability field. If a station device does not support the RSTP capability (e.g., does not send a frame announcing/indicating that its "RSTP Support" field is set to 1), and an access point is communicating with or scheduled to communicate with another device according to a R-TWT operation, then the access point may refuse or reject association with the station device, such that the station device may not interfere with the (latency-sensitive or R-TWT-based) communication between the access point and the another device. If the station device supports the RSTP capability (station device's RSTP Support field is set to 1), then the access point may allow communication with the station device, but may cause or instruct (or be in agreement with) the station device to end its communication before the start of the service period allocated or reserved for the another device, according to access rules for R-TWT operation. Accordingly, service/time periods reserved or allocated according to R-TWT operations can be protected from interference by legacy or other devices that may not support or operate according to R-TWT operations. Therefore, latency sensitive traffic, for example, for AR/VR content/applications, can be provided with reduced delay/latency through R-TWT operations.

FIG. 1 is a block diagram of an example artificial reality system environment. FIG. 1 provides an example environment in which devices may communicate traffic streams with different latency sensitivities/requirements. In some embodiments, the artificial reality system environment 100 includes an access point (AP) 105, one or more head wearable displays (HWD) 150 (e.g., HWD 150A, 150B) worn by a user, and one or more computing devices 110 (computing devices 110A, 110B) providing content of artificial reality to the HWDs 150.

The access point 105 may be a router or any network device allowing one or more computing devices 110 and/or one or more HWDs 150 to access a network (e.g., the Internet). The access point 105 may be replaced by any communication device (cell site). A HWD may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the computing device 110 through a wired or wireless connection. The HWD 150 may also identify objects (e.g., body, hand face).

In some embodiments, the computing devices 110A, 110B communicate with the access point 105 through communication links 102A, 102B (e.g., interlinks), respectively. In some embodiments, the computing device 110A may communicate with the HWD 150A through a communication link 125A (e.g., intralink), and the computing device 110B may communicate with the HWD 150B through a wireless link 125B (e.g., intralink).

The computing device 110 may be a computing device or a mobile device that can retrieve content from the access point 105, and can provide image data of artificial reality to a corresponding HWD 150. Each HWD 150 may present the image of the artificial reality to a user according to the image data.

The computing device 110 may determine a view within the space of the artificial reality corresponding to the detected location, orientation and/or the gaze direction, and generate an image depicting the determined view detected by the HWD 150s. The computing device 110 may also receive one or more user inputs and modify the image according to the user inputs. The computing device 110 may provide the image to the HWD 150 for rendering. The image of the space of the artificial reality corresponding to the user's view can be presented to the user.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the computing device 110 may be performed by the HWD 150, and/or some of the functionality of the HWD 150 may be performed by the computing device 110. In some embodiments, the computing device 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones)

that receives audio information from the HWD 150, the computing device 110, or both, and presents audio based on the audio information. In some embodiments, the HWD 150 includes sensors 155 (e.g., sensors 155A, 155B) including eye trackers and hand trackers for instance, a communication interface 165 (e.g., communication interface 165A, 165B), an electronic display 175, and a processor 170 (e.g., processor 170A, 170B). These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, hand trackers, eye trackers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the sensors 155 may also include eye trackers with electronic components or a combination of electronic components and software components that determine a gaze direction of the user of the HWD 150. In other embodiments, the eye trackers may be a component separate from sensors 155. In some embodiments, the HWD 150, the computing device 110 or a combination may incorporate the gaze direction of the user of the HWD 150 to generate image data for artificial reality. In some embodiments, the eye trackers (as part of the sensors 155, for instance) include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers may determine that the gaze direction of the user is 20 degrees from the reference direction. In some embodiments, a user of the HWD 150 can configure the HWD 150 (e.g., via user settings) to enable or disable the eye trackers as part of the sensors 155. In some embodiments, a user of the HWD 150 is prompted to enable or disable the eye trackers as part of the sensor 155 configuration.

In some embodiments, the sensors 155 include the hand tracker, which includes an electronic component or a combination of an electronic component and a software component that tracks a hand of the user. In other embodiments, the hand tracker may be a component separate from sensors 155. In some embodiments, the hand tracker includes or is coupled to an imaging sensor (e.g., camera) and an image processor that can detect a shape, a location and/or an orientation of the hand. The hand tracker may generate hand tracking measurements indicating the detected shape, location and/or orientation of the hand.

In some embodiments, the communication interfaces 165 (e.g., communication interface 165A, 165B) of the corresponding HWDs 150 (e.g., HWD 150A, 150B) and/or communication interfaces 115 (e.g., communication interface 115A, 115B) of the corresponding computing devices (e.g., computing device 110A, 110B) include an electronic component or a combination of an electronic component and a software component that is used for communication.

The communication interface 165 may communicate with a communication interface 115 of the computing device 110 through an intralink communication link 125 (e.g., communication link 125A, 125B). The communication interface 165 may transmit to the computing device 110 sensor measurements indicating the determined location of the HWD 150, orientation of the HWD 150, the determined gaze direction of the user, and/or hand tracking measurements. For example, the computing device 110 may receive sensor measurements indicating location and the gaze direction of the user of the HWD 150 and/or hand tracking measurements and provide the image data to the HWD 150 for presentation of the artificial reality, for example, through the wireless link 125 (e.g., intralink). For example, the communication interface 115 may transmit to the HWD 150 data describing an image to be rendered. The communication interface 165 may receive from the computing device 110 sensor measurements indicating or corresponding to an image to be rendered. In some embodiments, the HWD 150 may communicate with the access point 105.

Similarly, the communication interface 115 (e.g., communication interface 115A, 115B) of the computing devices 110 may communicate with the access point 105 through a communication link 102 (e.g., communication link 102A, 102B). In certain embodiments, the computing device 110 may be considered a soft access point (e.g., a hotspot device). Through the communication link 102 (e.g., interlink), the communication interface 115 may transmit and receive from the access point 105 AR/VR content. The communication interface 115 of the computing device 110 may also communicate with communication interface 115 of a different computing device 110 through communication link 185. As described herein, the communication interface 115 may be a counterpart component to the communication interface 165 to communicate with a communication interface 115 of the computing device 110 through a communication link (e.g., USB cable, a wireless link).

The communication interfaces 115 and 165 may receive and/or transmit information indicating a communication link (e.g., channel, timing) between the devices (e.g., between the computing devices 110A and 110B across communication link 185, between the HWD 150A and computing device 110A across communication link 125). According to the information indicating the communication link, the devices may coordinate or schedule operations to avoid interference or collisions.

The communication link may be a wireless link, a wired link, or both. In some embodiments, the communication interface 165/115 includes or is embodied as a transceiver for transmitting and receiving data through a wireless link. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the computing device 110 and the head wearable display 150 are implemented on a single system, the communication interface 165 may communicate with the computing device 110 through a bus connection or a conductive trace.

Using the communication interface, the computing device 110 (or HWD 150, or AP 105) may coordinate operations on links 102, 185 or 125 to reduce collisions or interferences by scheduling communication. For example, the computing device 110 may coordinate communication between the computing device 110 and the HWD 150 using communication link 125. Data (e.g., a traffic stream) may flow in a direction on link 125. For example, the computing device 110 may communicate using a downlink (DL) communication to the HWD 150 and the HWD 150 may communicate using an uplink (UL) communication to the computing device 110. In some implementations, the computing device 110 may transmit a beacon frame periodically to announce/advertise a presence of a wireless link between the computing device 110 and the HWD 150 (or between HWDs 150A and 150B). In an implementation, the HWD 150 may monitor for or receive the beacon frame from the computing device 110, and can schedule communication with the HWD 150 (e.g., using the information in the beacon frame, such as an offset value) to avoid collision or interference with communication between the computing device 110 and/or HWD 150 and other devices.

In some embodiments, the processor 170 may include an image renderer, for instance, which includes an electronic component or a combination of an electronic component and a software component that generates one or more images for display, for example, according to a change in view of the space of the artificial reality. In some embodiments, the image renderer is implemented as processor 170 (or a graphical processing unit (GPU), one or more central processing unit (CPUs), or a combination of them) that executes instructions to perform various functions described herein. In other embodiments, the image renderer may be a component separate from processor 170. The image renderer may receive, through the communication interface 165, data describing an image to be rendered, and render the image through the electronic display 175. In some embodiments, the data from the computing device 110 may be encoded, and the image renderer may decode the data to generate and render the image. In one aspect, the image renderer receives the encoded image from the computing device 110, and decodes the encoded image, such that a communication bandwidth between the computing device 110 and the HWD 150 can be reduced.

In some embodiments, the image renderer receives, from the computing device, 110 additional data including object information indicating virtual objects in the artificial reality space and depth information indicating depth (or distances from the HWD 150) of the virtual objects. Accordingly, the image renderer may receive from the computing device 110 object information and/or depth information. The image renderer may also receive updated sensor measurements from the sensors 155. The process of detecting, by the HWD 150, the location and the orientation of the HWD 150 and/or the gaze direction of the user wearing the HWD 150, and generating and transmitting, by the computing device 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer may generate a small portion (e.g., 10%) of an image corresponding to an updated view within the artificial reality according to the updated sensor measurements, and append the portion to the image in the image data from the computing device 110 through reprojection. The image renderer may perform shading and/or blending on the appended edges. Hence, without recreating the image of the artificial reality according to the updated sensor measurements, the image renderer can generate the image of the artificial reality.

In other implementations, the image renderer generates one or more images through a shading process and a reprojection process when an image from the computing device 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the processor 170 (e.g., image renderer).

In some embodiments, the HWD 150 may include a lens to allow the user to see the display 175 in a close proximity. The lens may be a mechanical component that alters received light from the electronic display 175. The lens may magnify the light from the electronic display 175, and correct for optical error associated with the light. The lens may be a Fresnel lens, a convex lens, a concave lens, a filter, or any suitable optical component that alters the light from the electronic display 175. Through the lens, light from the electronic display 175 can reach the pupils, such that the user can see the image displayed by the electronic display 175, despite the close proximity of the electronic display 175 to the eyes.

In some embodiments, the processor 170 performs compensation to compensate for any distortions or aberrations. In some embodiments, a compensator may be a device separate from the processor 170. The compensator includes an electronic component or a combination of an electronic component and a software component that performs compensation. In one aspect, the lens introduces optical aberrations such as a chromatic aberration, a pin-cushion distortion, barrel distortion, etc. The compensator may determine a compensation (e.g., predistortion) to apply to the image to be rendered from the image renderer to compensate for the distortions caused by the lens, and apply the determined compensation to the image from the image renderer. The compensator may provide the predistorted image to the electronic display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a communication interface 115, a processor 118, and a content provider 130 (e.g., content provider 130A, 130B). These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view.

The processors 118, 170 includes or is embodied as one or more central processing units, graphics processing units, image processors, or any processors for generating images of the artificial reality. In some embodiments, the processors 118, 170 may configure or cause the communication interfaces 115, 165 to toggle, transition, cycle or switch between a sleep mode and a wake up mode. In the wake up mode, the processor 118 may enable the communication interface 115 and the processor 170 may enable the communication interface 165, such that the communication interfaces 115, 165 may exchange data. In the sleep mode, the processor 118 may disable the wireless interface 115 and the processor 170 may disable (e.g., may implement low power or reduced operation in) the communication interface 165, such that the communication interfaces 115, 165 may not consume power, or may reduce power consumption.

The processors 118, 170 may schedule the communication interfaces 115, 165 to switch between the sleep mode and the wake up mode periodically every frame time (e.g., 11 ms or 16 ms). For example, the communication interfaces 115, 165 may operate in the wake up mode for 2 ms of the frame time, and the communication interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced or minimized.

In some embodiments, the processors 118, 170 may configure or cause the communication interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the communication interfaces 115, 165 to enter a subsequent wake up mode according to timing of the previous communication indicated by the stored information. For example, the communication interfaces 115, 165 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the communication interfaces 115, 165 to resume communication via the channel or frequency band of the previous communication indicated by the stored information. Accordingly, the communication interfaces 115, in 165 entering the wake up mode from the sleep mode may resume communication, while bypassing a scan procedure to search for available channels and/or performing handshake or authentication. Bypassing the scan procedure allows extension of a duration of the communication interfaces 115, 165 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space. The content provider 130 may encode the image data describing the image, and can transmit the encoded data to the HWD 150. In some embodiments, the content provider generates and provides the image data to the HWD 150 periodically (e.g., every 11 ms or 16 ms).

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

In some embodiments, a scheduler 118 (e.g., scheduler 118A of the computing device 118A and/or scheduler 118B of the computing device 110B) may request R-TWT to transmit latency sensitive traffic using P2P communication. The AP 105 and scheduler 118 of the computing devices 110 may negotiate (e.g., perform a handshake process) and may establish a membership of a restricted TWT schedule. In some embodiments, when the AP 105 and the scheduler 118 are negotiating, the AP 105 may be considered a restricted TWT scheduling AP and the computing devices 110 may be considered a restricted TWT scheduled STA.

In some embodiments, the HWD 150 may request to send P2P traffic to the computing device 110. Accordingly, the HWD 150 may be considered the TWT requesting STA (e.g., the TWT STA that requests the TWT agreement), and the computing device 110 may be considered TWT responding STA (e.g., the TWT STA that respond to the TWT request). The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105. In other embodiments, the computing device 110 may request to send P2P traffic to the HWD 150 such that the computing device 110 is considered the TWT requesting STA and the HWD 150 is the TWT responding STA.

The schedulers 118 of the computing devices 110 may schedule communication between the computing device(s) 110 and the HWD(s) 150 with the AP 105 such that the communication between the computing device(s) 110 and HWD(s) 150 is protected. The computing device(s) 110 may initiate such protected P2P communication with the HWD(s) 150 by indicating, to the AP 105, that the computing device(s) 110 wish to schedule P2P communication in R-TWT service periods (SPs). The scheduler 118 of the computing device(s) may schedule (or negotiate) the requested R-TWT SP(s). The scheduler 118 of the computing device(s) may also indicate if the SP(s) are requested only for P2P communication (as compared to mixed P2P communication and non-P2P communication).

Figure 2:
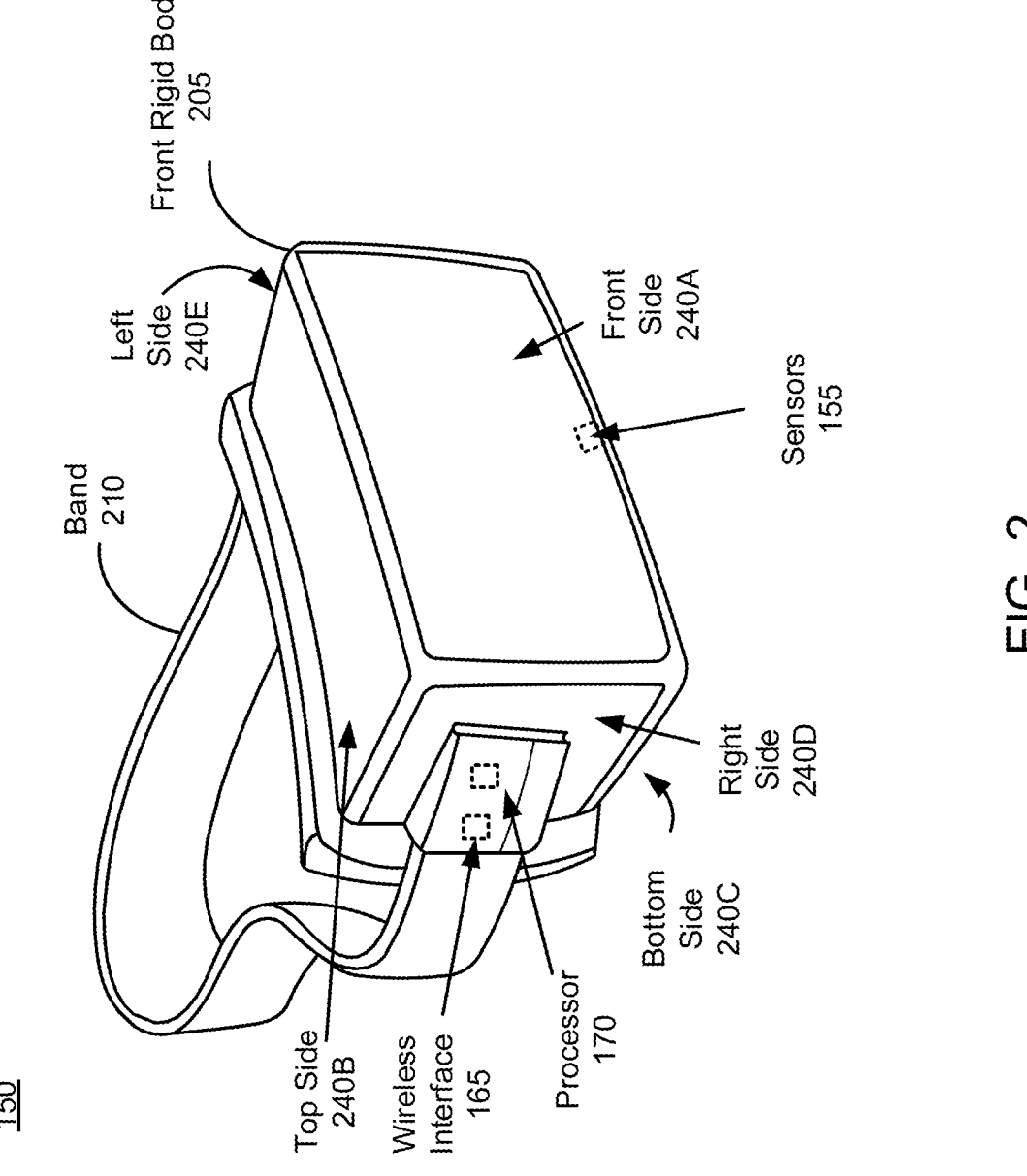
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens (not shown in FIG. 2), the sensors 155, the eye trackers the communication interface 165, and the processor 170. In the embodiment shown by FIG. 2, the sensors 155 are located within the front rigid body 205, and may not be visible to the user. In other embodiments, the HWD 150 has a different configuration than shown in FIG. 2. For example, the processor 170, the eye trackers, and/or the sensors 155 may be in different locations than shown in FIG. 2.

Figure 3:
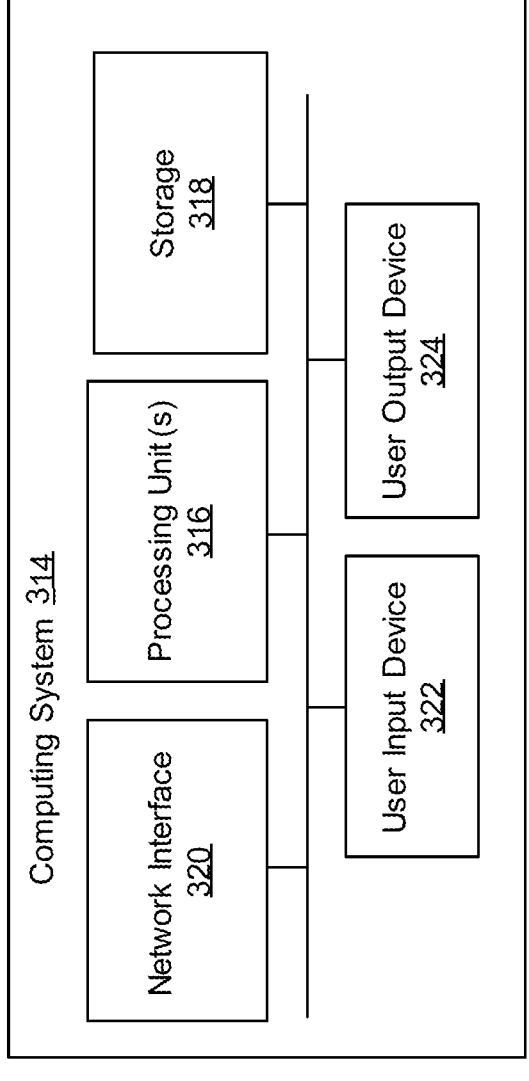
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the computing device 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digitalto-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
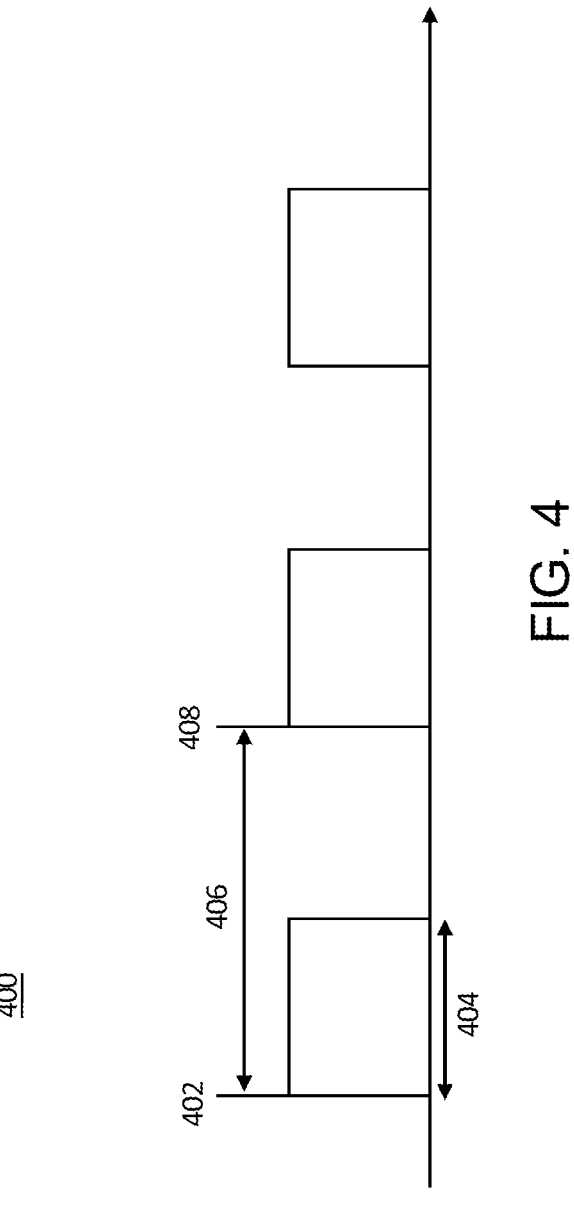
FIG. 4 is a timing diagram showing a wake-up/sleep schedule of a computing device utilizing TWT, according to an example implementation of the present disclosure.

FIGS. 1-2 illustrate devices that communicate traffic streams some of which may be latency sensitive (e.g., those carrying periodic AR/VR information/content). As described herein, the periodic operation of TWT benefits communication of periodic traffic (e.g., latency sensitive traffic) by predictably communicating the periodic traffic. FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a SP. After the SP duration 404, the computing device 110 may enter a sleep state until the next TWT start time at 408. The interval of time between TWT start time 402 and TWT start time 408 may be considered the SP interval 406.

A TWT schedule may be communicated and/or negotiated using broadcast TWT and/or individual TWT (iTWT) signaling. In some embodiments, to signal iTWT, TWT schedule information may be communicated to particular (individual) devices using a mode such as a Network Allocation Vector (NAV) to protect the medium access of TWT SPs. In contrast, to signal broadcast TWT, in some embodiments, a device (such as AP 105) may schedule TWT SPs with other devices (e.g., computing devices 110 and/or HWDs 150) and may share schedule information in beacon frames and/or probe response frames. Sharing schedule information using broadcast TWT may reduce overhead (e.g., negotiation overhead) as compared to the overhead used when sharing information using iTWT.

The TWT mechanism may also be used in peer-to-peer (P2P) communication. For example, TWT may be defined for tunneled direct link setup (TDLS) pairs (e.g., non-AP STAs), soft APs (such as computing devices 110) and STAs (such as HWD 150), and/or peer-to-peer group owners (GO) and group clients (GC). For instance, a TDLS pair of devices (e.g., HWD 150 and computing device 110) can request TWT membership for its latency sensitive traffic over a channel. In another example, a group owner (GO), such as a computing device 110, may request TWT membership for latency sensitive traffic over the P2P link.

When P2P communication is established, various channel access rules may govern the P2P communication. An AP assisted P2P trigger frame sequence may reduce the contention/collision associated with TWT (or R-TWT) in P2P communication. Accordingly, a P2P model where a P2P STA (e.g., a HWD 150) is not associated with an infra-basic service set (BSS) AP, may improve P2P communication. Without AP's assistance or coordination, a transmission over the P2P link may collide with another transmission in the BSS. In some embodiments, a reverse direction protocol (RDP) may be enabled for P2P communication. During RDP, when a transmitting STA has obtained a transmit opportunity (TXOP), the transmitting STA may grant permission for the receiving STA to transmit information back to the transmitting STA during the same TXOP. Accordingly, if a TWT setup allows P2P transmission and indicates RDP, the P2P communication can be performed after a triggered frame sequence (e.g., a reverse direction frame exchange). In other embodiments, other protocols may be enabled for P2P communication. In some embodiments, trigger-enabled TWT can reduce the medium contention and/or collisions between UL and DL transmissions. The trigger-enabled TWT may be indicated using a TWT information element (IE).

Restricted TWT (R-TWT) is a type of broadcast TWT. R-TWT can provide predictable and periodic schedules for member stations (STAs) (e.g., members of an R-TWT schedule) to deliver latency sensitive traffic (LST). Extremely high throughput (EHT) STAs may stop/terminate/end their Transmit Opportunity (TXOP) before the start of an R-TWT service period (SP) which may be set up for another STA. The TXOP is a STA's opportunity to transmit on a wireless medium. Generally, STAs may wait their turns to transmit on the wireless medium. STAs ending their TXOPs before the start of an SP of an R-TWT schedule can ensure that the wireless medium is clear/idle at the start of the R-TWT SP so that LST traffic can be delivered with priority during the R-TWT SP. A STA that is a member of the R-TWT schedule may start transmitting LST traffic during the R-TWT SP (e.g. without interference from ongoing or new transmissions).

R-TWT schedules, along with other broadcast TWT schedules may be advertised by devices (e.g., APs) in a TWT element of beacons and other broadcast frames. Such advertisement enables STAs to know (or be notified/informed of) what R-TWT schedules exist. R-TWT schedules have certain additional characteristics (compared to broadcast TWT schedules). Existing signaling for TWT advertisement is designed for broadcast TWT schedules, and the R-TWT operations may be improved by supporting such additional characteristics of R-TWT.

To solve this problem, according to certain aspects, embodiments in the present disclosure relate to techniques for providing a mechanism for a device (e.g., AP or non-AP device (STA)) to advertise R-TWT schedules by indicating whether R-TWT schedules (or SPs thereof) are active (e.g., R-TWT schedules having at least one member STA) or not. In some embodiments, a device may advertise R-TWT schedules to enable R-TWT supporting STAs to learn (be notified/informed of) the start times of SPs of active R-TWT schedules (e.g., SPs of all active R-TWT schedules set up in the basic service set (BSS) of the device and the STAs). With the knowledge/information of the start times of SPs of the active R-TWT schedules, the STAs can stop/terminate/end their TXOPs before the start of SPs of such active R-TWT schedules and do not need to stop/terminate/end their TXOPs before the start of SPs of non-active R-TWT schedules (e.g., schedules having no member STAs).

In one approach, a device (e.g., AP or non-AP device (STA)) may advertise R-TWT schedules by indicating whether the device can accept new membership for STA(s) to join a particular R-TWT schedule. With the knowledge/information of whether the device can accept new membership to a particular R-TWT schedule, STAs may request a new membership of an R-TWT schedule depending not only on the STA's traffic demands but also on whether the new membership is acceptable. The STAs may also send to the device a request for a new R-TWT schedule depending on whether the device can accept new membership to another R-TWT schedule.

In some embodiments, an advertisement of an R-TWT schedule may indicate whether the R-TWT schedule (or an SP thereof) is active. An R-TWT schedule may be indicated as "active" if any STAs have established membership in the R-TWT schedule; otherwise the R-TWT schedule may not be active. In some embodiments, an R-TWT schedule may not be active if membership of the R-TWT schedule is suspended (e.g., a new membership cannot be accepted). A device (e.g., AP) may advertise an R-TWT schedule without any member to invite membership. If the R-TWT schedule set up by the device is not active (or the R-TWT schedule has no members), STAs in the same BSS as the device may not (or may determine not to, or may not need to) stop/terminate/end their TXOPs at the start boundary (or start time) of an SP of the R-TWT schedule.

In some embodiments, an advertisement of an R-TWT schedule may indicate whether the R-TWT schedule (or an SP thereof) is full. An R-TWT schedule set up by a device (e.g., AP) may be indicated as "full" if the device is unlikely to (or cannot) accept a request for a new membership of the R-TWT schedule. In some embodiments, an R-TWT schedule set up by a device (e.g., AP) may be indicated as "full" if the device is unlikely to (or cannot) accept a request from an existing member of the R-TWT schedule to increase a schedule duration (e.g., an SP duration or a nominal minimum TWT wake duration). In some embodiments, an R-TWT schedule set up by a device (e.g., AP) may be indicated as "full" if the R-TWT schedule already has been allocated enough resources and the device likely cannot accommodate more membership requests. In some embodiments, upon receiving an advertisement of an R-TWT schedule including an indication whether the R-TWT schedule (or an SP thereof) is full, a STA may determine, based on the indication, whether the R-TWT schedule (or an SP thereof) is a target for establishing membership.

In some embodiments, an advertisement of an R-TWT schedule sent by a device (e.g., AP) may include an indication whether the R-TWT schedule is associated with (or set up for) an overlapping basic service set (OBSS) which is different from the BSS of the device. If there exists an OBSS in a WLAN, two or more APs or STAs installed close together and operating on the same transmission channel that have no connection to each other may interfere with each other, thereby reducing the network performance of the WLAN. Using an advertisement, a device (e.g., AP) may share R-TWT schedules across multiple BSSs to help with managing interference between BSSs for instance. The device may advertise an R-TWT schedule by indicating whether the advertised R-TWT schedule is from the device's own network/BSS or an OBSS. In some embodiments, if the advertisement of an R-TWT schedule sent by a device (e.g., AP) indicates that the R-TWT schedule is from (or associated with or set up for) an OBSS which is different from the BSS of the device, the device may identify the OBSS (using a BSS identifier (BSSID) of the OBSS) in the advertisement. In some embodiments, upon receiving, from a device (e.g., AP), an advertisement of an R-TWT schedule including an indication that the R-TWT schedule (or an SP thereof) is associated with an OBSS which is different from the device's own BSS, STAs can stop/terminate/end their TXOPs before the start of an SP of the R-TWT schedule of the OBSS, to avoid interference with transmission(s) during the SP of the R-TWT schedule.

In one approach, an advertisement frame (e.g., beacon frames or other management frames such as probe request/response, association/disassociation, etc.) may include a TWT element (or TWT information element (IE)). A TWT IE associated with an R-TWT schedule set up by a device (e.g., AP) may include a plurality of bits respectively indicating (1) a first property of whether the R-TWT schedule is active, (2) a second property of whether the R-TWT schedule is full, and (3) a third property of whether the R-TWT schedule is associated with a BSS of the device or an OBSS which is different from the device's own BSS.

In one approach, a TWT IE associated with an R-TWT schedule set up by a device (e.g., AP) may include two (or more) bits indicating (1) a first property of whether the R-TWT schedule is active, (2) a second property of whether the R-TWT schedule is full, and (3) a third property of whether the R-TWT schedule is associated with a BSS of the device or an OBSS which is different from the device's own BSS. An active R-TWT schedule (or an active SP thereof) may be an R-TWT schedule (or an SP thereof) for which at least one R-TWT scheduled STA has established membership with an R-TWT scheduling device (e.g., AP). A full R-TWT schedule (or a full SP thereof) may be an R-TWT schedule (or an SP thereof) for which an R-TWT scheduling device (e.g., AP) is unlikely to (or cannot) accept a request for a new membership to the R-TWT schedule or a request from an existing member of the R-TWT schedule to increase a schedule duration of the R-TWT schedule (e.g., an SP duration or a nominal minimum TWT wake duration). In some embodiments, the TWT IE may include the field of broadcast TWT parameter set which describes a broadcast TWT schedule and/or an R-TWT schedule. In some embodiments, the broadcast TWT parameter set field may include the fields of target wake time, nominal minimum TWT wake duration, broadcast TWT information. The field of broadcast TWT information may include the two bits as a subfield of restricted TWT schedule information. The broadcast TWT parameter set field may not have enough available (e.g., reserved) bits to respectively indicate all of the first property, the second property and the third property.

In some embodiments, a 2-bit encoding may deliver/indicate information about some or all of the first, second and third properties of an R-TWT schedule (or an SP thereof). For example, a TWT IE associated with an R-TWT schedule set up by a device (e.g., AP) may include two bits (B1 B2) as a restricted TWT schedule information subfield, which are encoded as shown in Table 1.

TABLE 1

| Example Two-bit Encoding of restricted TWT schedule Information Subfield Values | |
| --- | --- |
| Restricted TWT schedule information subfield value (B1 B2) | Description (when included in the TWT IE of a TWT advertisement frame associated with an R-TWT schedule and sent by a device (e.g., AP)) |
| 0 (B1 = 0, B2 = 0) | The R-TWT schedule (and SP thereof) does not have any active memberships established, and hence is not an active R-TWT schedule. |
| 1 (B1 = 0, B2 = 1) | The R-TWT schedule is an active R-TWT schedule which can accommodate more memberships. |
| 2 (B1 = 1, B2 = 0) | The R-TWT schedule is an active R-TWT schedule which is full such that the device is unlikely to (or cannot) accept a request to setup a new membership in this R-TWT schedule or a request to increase nominal minimum TWT wake duration of an existing membership |
| 3 (B1 = 1, B2 = 1) | The R-TWT schedule is an active R-TWT schedule which is setup by EHT STAs in a neighboring BSS (e.g., OBSS) |

In some embodiments, the value "0" of the restricted TWT schedule information subfield (B1=0, B2=0) in an advertisement frame associated with an R-TWT schedule (and an SP thereof) may indicate that the R-TWT schedule is not active (and accordingly not full for instance). Accordingly, a STA that receives the advertisement frame may not have to stop/terminate/end the STA's TXOP at the start of an SP of the r-TWT schedule.

In some embodiments, the value "1" of the restricted TWT schedule information subfield (B1=0, B2=1) in an advertisement frame associated with an R-TWT schedule (and an SP thereof) may indicate that the R-TWT schedule is active but not full. Accordingly, a STA that receives the advertisement frame may/will/should stop/terminate/end its TXOP at the start of an SP of the r-TWT schedule. A STA that receives the advertisement frame may also request membership of the r-TWT schedule (or an SP thereof). A STA that receives the advertisement frame may request/negotiate an increase in a schedule duration (e.g., an SP duration or a nominal minimum TWT wake duration).

In some embodiments, the value "2" of the restricted TWT schedule information subfield (B1=1, B2=0) in an advertisement frame associated with an R-TWT schedule (and an SP thereof) may indicate that the schedule is active and full. Accordingly, a STA that receives the advertisement frame may/will/should stop/terminate/end its TXOP at the start of an SP of the r-TWT schedule. A STA that receives the advertisement frame may request membership of the r-TWT schedule (or an SP thereof) but a scheduling device (e.g., AP) may be unlikely to (or cannot) accept new members of the R-TWT schedule. In some embodiments, a STA that receives the advertisement frame may not request membership of the r-TWT schedule (or an SP thereof). A STA that receives the advertisement frame may request/negotiate an increase in a schedule duration (e.g., an SP duration or a nominal minimum TWT wake duration), but the AP is unlikely to accept the increased minimum TWT wake duration because the AP is indicating that the resources are mostly used up (e.g., allocated). In some embodiments, a STA that receives the advertisement frame may not request/negotiate an increase in a schedule duration.

In some embodiments, the value "3" of the restricted TWT schedule information subfield (B1=1, B2=1) in an advertisement frame associated with a TWT schedule (and an SP thereof) and sent by a first device (e.g., AP) may indicate that the schedule is active, but the TWT schedule has been setup by a second device (e.g., AP) in a neighboring BSS (e.g., OBSS). Accordingly, a STA that receives this advertisement may/will/should stop/terminate/end its TXOP at the start of an SP of the TWT schedule. In some embodiments, the first device may detect the TWT schedule setup by the second device by capturing and analyzing a Physical Layer Convergence Procedure (PLCP) Protocol Data Unit carrying an advertisement frame transmitted in, or originating from, an OBSS. In some embodiments, the first device may identify/detect/monitor an identifier of the OBSS, e.g., a BSSID, associated with the advertised TWT schedule. For example, the container carrying a restricted TWT schedule information subfield (of an advertisement frame in the OBSS) may be a PLCP Protocol Data Unit, and the first device may identify BSSID of the OBSS by capturing the PLCP Protocol Data Unit and extracting a MAC header (which include BSSID of the OBSS) from the PLCP Protocol Data Unit. Additionally or alternatively, one or more bits may be added/modified in the advertisement frame to identify the OBSS. For example, the subfield of BSSID of the OBSS may be added to a TWT IE of the advertisement frame to identify the OBSS.

In some embodiments, the value "3" of the restricted TWT schedule information subfield (B1=1, B2=1) in an advertisement frame associated with an R-TWT schedule (and an SP thereof) may indicate that the R-TWT schedule is active and full, or active and not full. Accordingly, a STA that receives this advertisement may/will/should stop/terminate/end its TXOP at the start of an SP of the r-TWT schedule.

The encoding of the restricted TWT schedule information subfield is not limited to the two-bit encoding as shown in Table 1. In some embodiments, a TWT IE associated with an R-TWT schedule set up by a device (e.g., AP) may include two bits (B1 B2) as a restricted TWT schedule information subfield, which are encoded as shown in Table 2 below.

TABLE 2

Two-bit Encoding of restricted TWT schedule Information Subfield Values

| Restricted TWT schedule information subfield value (B1 B2) | Description (when included in the TWT IE carried in a TWT advertisement frame corresponding to an R-TWT schedule and sent by a device (e.g., AP)) |
|---|---|
| 0 (B1 = 0, B2 = 0) | The R-TWT schedule (and SP thereof) does not have any active memberships established, and hence is not an active R-TWT schedule. |
| 1 (B1 = 0, B2 = 1) | The R-TWT schedule is an active R-TWT schedule which can accommodate more memberships. |
| 3 (B1 = 1, B2 = 1) | The R-TWT schedule is an active R-TWT schedule which is full such that the device is unlikely to (or cannot) accept a request to setup a new membership in this R-TWT schedule or a request to increase nominal minimum TWT wake duration of an existing membership |
| 2( B1 = 1, B2 = 0) | The R-TWT schedule is an active R-TWT schedule which is setup by STAs (e.g., EHT STAs) in a neighboring BSS (e.g., OBSS) |

In one approach, a device may one or more processors. The one or more processors may be configured to generate a frame relating to a target wake time (TWT) schedule. The one or more processors may be configured to determine whether the device can accept a request for a new membership of the TWT schedule. In response to determining that the device cannot accept a request for a new membership of the TWT schedule, the one or more processors may be configured to set a subfield of the frame to a first value, indicating, to a receiver device receiving the frame, to avoid sending a request for a new membership of the TWT schedule. The one or more processors may be configured to wirelessly transmit, via a transmitter, the generated frame to the receiver device.

In some embodiments, the TWT schedule may be a restricted TWT (R-TWT) schedule. In some embodiments, the receiver device receiving the frame may be in the same basic service set (BSS) as the device.

In some embodiments, the one or more processors may be configured to determine whether the device can allocate one or more resources for a new membership of the TWT schedule. In response to determining that the device cannot allocate one or more resources for a new membership of the TWT schedule, the one or more processors may be configured to determine that the device cannot accept a request for a new membership of the TWT schedule.

In some embodiments, the one or more processors may be configured to determine whether the device can accept a request for increasing a duration of a service period (SP) of the TWT schedule. In response to determining that the device cannot accept a request for increasing the duration of the SP of the TWT schedule, the one or more processors may be configured to set the subfield of the frame to the first value, indicating, to the receiver device receiving the frame, to avoid sending a request for increasing the duration of the SP of the TWT schedule.

In some embodiments, the one or more processors may be configured to determine whether there is at least one wireless device having a membership of the TWT schedule. In response to determining that there is at least one wireless device having a membership of the TWT schedule, the one or more processors may be configured to set the subfield of the frame to a second value, indicating, to the receiver device receiving the frame, to end a Transmit Opportunity (TXOP) duration before a start time of a service period (SP) of the TWT schedule. In response to determining that there is no wireless device having a membership of the TWT schedule, the one or more processors may be configured to set the subfield of the frame to a third value.

In some embodiments, the one or more processors may be configured to determine whether there exists another TWT schedule set up for an overlapping basic service set (OBSS) which is different from a BSS of the device. In response to determining that there exists another TWT schedule set up for the OBSS, the one or more processors may be configured to set the subfield of the frame to a fourth value, indicating, to the receiver device receiving the frame, to end a Transmit Opportunity (TXOP) duration before a start time of a service period (SP) of the another TWT schedule. There may be at least one wireless device having a membership in the another TWT schedule. In response to determining that there exists another TWT schedule set up for the OBSS, the one or more processors may be configured to set another subfield of the frame to an identifier of the OBSS.

Embodiments in the present disclosure have at least the following advantages and benefits.

First, embodiments in the present disclosure can provide useful techniques for advertising characteristics of an R-TWT schedule to STAs, so that the STAs can avoid performing unnecessary or unpromising operations. For example, a STA that receives an advertisement frame indicating a non-active R-TWT schedule may not have to stop/terminate/end the STA's TXOP at the start of an SP of the non-active R-TWT schedule. Also, a STA that receives an advertisement frame indicating that an R-TWT schedule is full (e.g., the AP unlikely will accept new membership of the R-TWT schedule), may not request membership of the R-TWT schedule nor request/negotiate an increase in a schedule duration of the R-TWT schedule.

Second, embodiments in the present disclosure can provide useful techniques for advertising presence of a TWT schedule set up for a neighboring BSS (e.g., OBSS) to STAs, so that the STAs can stop/terminate/end its TXOP at the start of an SP of the TWT schedule, thereby avoiding interference or collisions with AP/STAs in the neighboring BSS.

Figure 5:
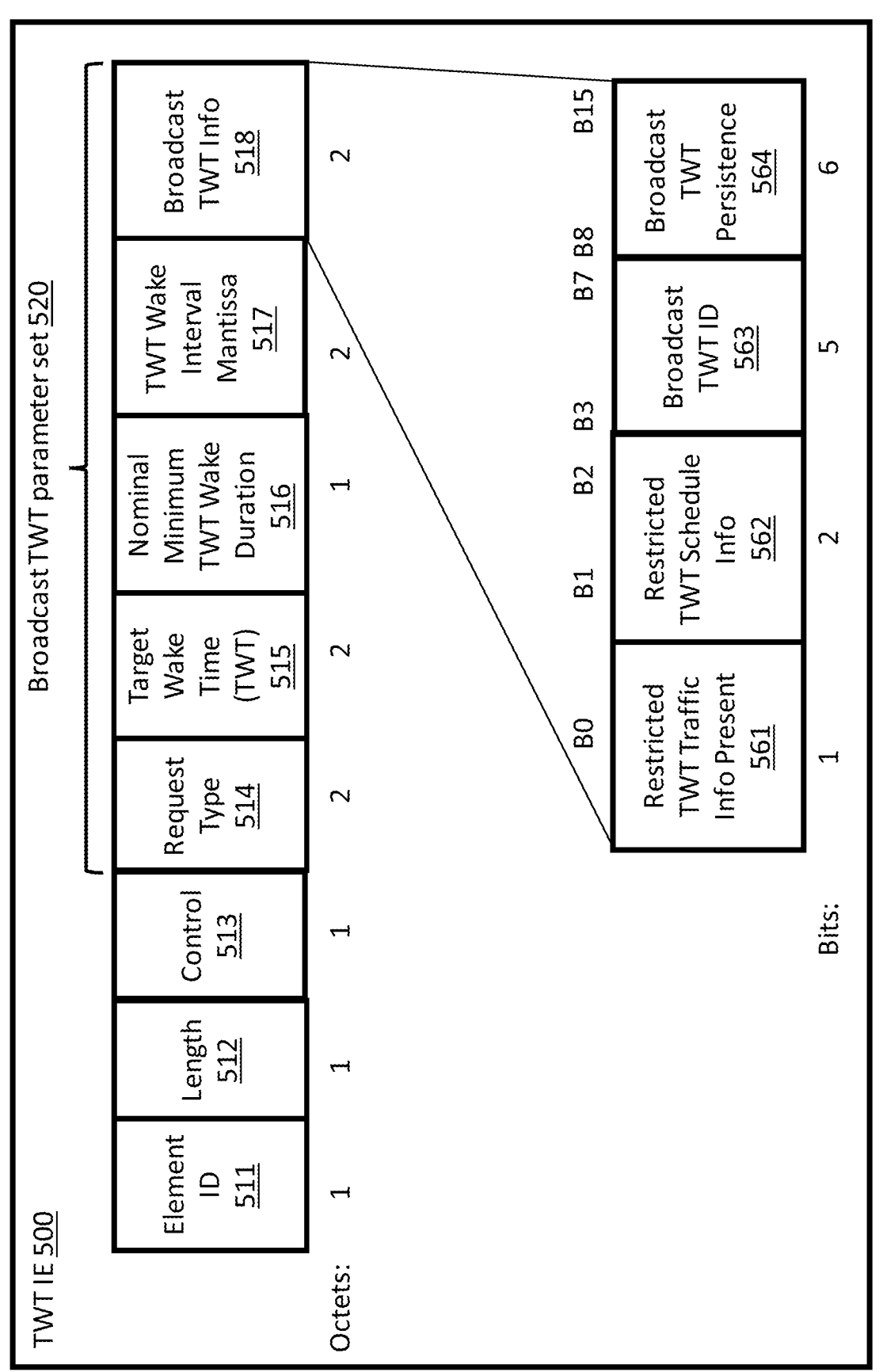
FIG. 5 is an example format of a TWT element field associated with a restricted target wake time (R-TWT) schedule, according to an example implementation of the present disclosure.

FIG. 5 shows an example format of a TWT element field (or TWT IE) 500 associated with an R-TWT schedule, according to an example implementation of the present disclosure. The TWT IE 500 may include the fields of element ID 511, length 512, control 513, request type 514, target wake time 515, nominal minimum TWT wake duration 516, TWT wake interval mantissa 517, and/or broadcast TWT information 518. In some embodiments, the TWT IE 500 may include the field of broadcast TWT parameter set

520 which describes a broadcast TWT schedule and/or an R-TWT schedule. In some embodiments, the field of broadcast TWT information 518 may include the subfields of restricted TWT traffic information present 561, restricted TWT schedule information 562, broadcast TWT ID 563, and/or broadcast TWT persistence 564.

In some embodiments, an advertisement frame (e.g., TWT advertisement frame 740 in FIG. 7) may include a TWT element or TWT information element (IE) 500. An active R-TWT schedule (or an active SP thereof) may be an R-TWT schedule (or an SP thereof) for which at least one R-TWT scheduled STA has established membership with an R-TWT scheduling device (e.g., AP). A full R-TWT schedule (or a full SP thereof) may be an R-TWT schedule (or an SP thereof) for which an R-TWT scheduling device (e.g., AP) is unlikely to (or cannot) accept a request for a new membership of the R-TWT schedule or a request from an existing member of the R-TWT schedule to increase a schedule duration of the R-TWT schedule (e.g., an SP duration or a nominal minimum TWT wake duration). In some embodiments, the TWT IE associated with an R-TWT schedule set up by a device (e.g., AP) may include a plurality of bits (not shown) respectively indicating (1) a first property of whether the R-TWT schedule is active, (2) a second property of whether the R-TWT schedule is full, and (3) a third property of whether the R-TWT schedule is associated with a BSS of the device or an OBSS which is different from the device's own BSS.

In some embodiments, referring to FIG. 5, the TWT IE 500 associated with an R-TWT schedule set up by a device (e.g., AP) may include two bits (e.g., (B1 B2) of the restricted TWT schedule information subfield 562) indicating (1) a first property of whether the R-TWT schedule is active, (2) a second property of whether the R-TWT schedule is full, and (3) a third property of whether the R-TWT schedule is associated with a BSS of the device or an OBSS which is different from the device's own BSS. In some embodiments, the broadcast TWT parameter set field 520 may include the fields of target wake time 515, nominal minimum TWT wake duration 516, broadcast TWT information 518. The broadcast TWT information field 518 may include the two bits (B1 B2) as the restricted TWT schedule information subfield 562. The broadcast TWT parameter set field 520 may not have enough available (e.g., reserved) bits to respectively indicate all of the first property, the second property and the third property.

In some embodiments, a 2-bit encoding may deliver/indicate information about some or all of the first, second and third properties of an R-TWT schedule (or an SP thereof). For example, the TWT IE 500 associated with an R-TWT schedule set up by a device (e.g., AP) may include two bits (B1 B2) as the restricted TWT schedule information subfield 562, which are encoded as shown in Table 1 or Table 2 shown above. For example, the value "0" of the restricted TWT schedule information subfield 562 (B1=0, B2=0) in an advertisement frame associated with an R-TWT schedule (and an SP thereof) may indicate that the R-TWT schedule is not active (and accordingly not full for instance). The value "1" of the restricted TWT schedule information subfield 562 (B1=0, B2=1) in an advertisement frame associated with an R-TWT schedule (and an SP thereof) may indicate that the R-TWT schedule is active but not full. The value "2" of the restricted TWT schedule information subfield 562 (B1=1, B2=0) in an advertisement frame associated with an R-TWT schedule (and an SP thereof) may indicate that the schedule is active and full. The value "3" of the restricted TWT schedule information subfield 562

(B1=1, B2=1) in an advertisement frame associated with a TWT schedule (and an SP thereof) and sent by a first device (e.g., AP) may indicate that the schedule is active, but the TWT schedule has been setup by a second device (e.g., AP) in a neighboring BSS (e.g., OBSS). In some embodiments, the value "3" of the restricted TWT schedule information subfield 562 (B1=1, B2=1) in an advertisement frame associated with an R-TWT schedule (and an SP thereof) may indicate that the R-TWT schedule is active and full, or active and not full.

Figure 6:
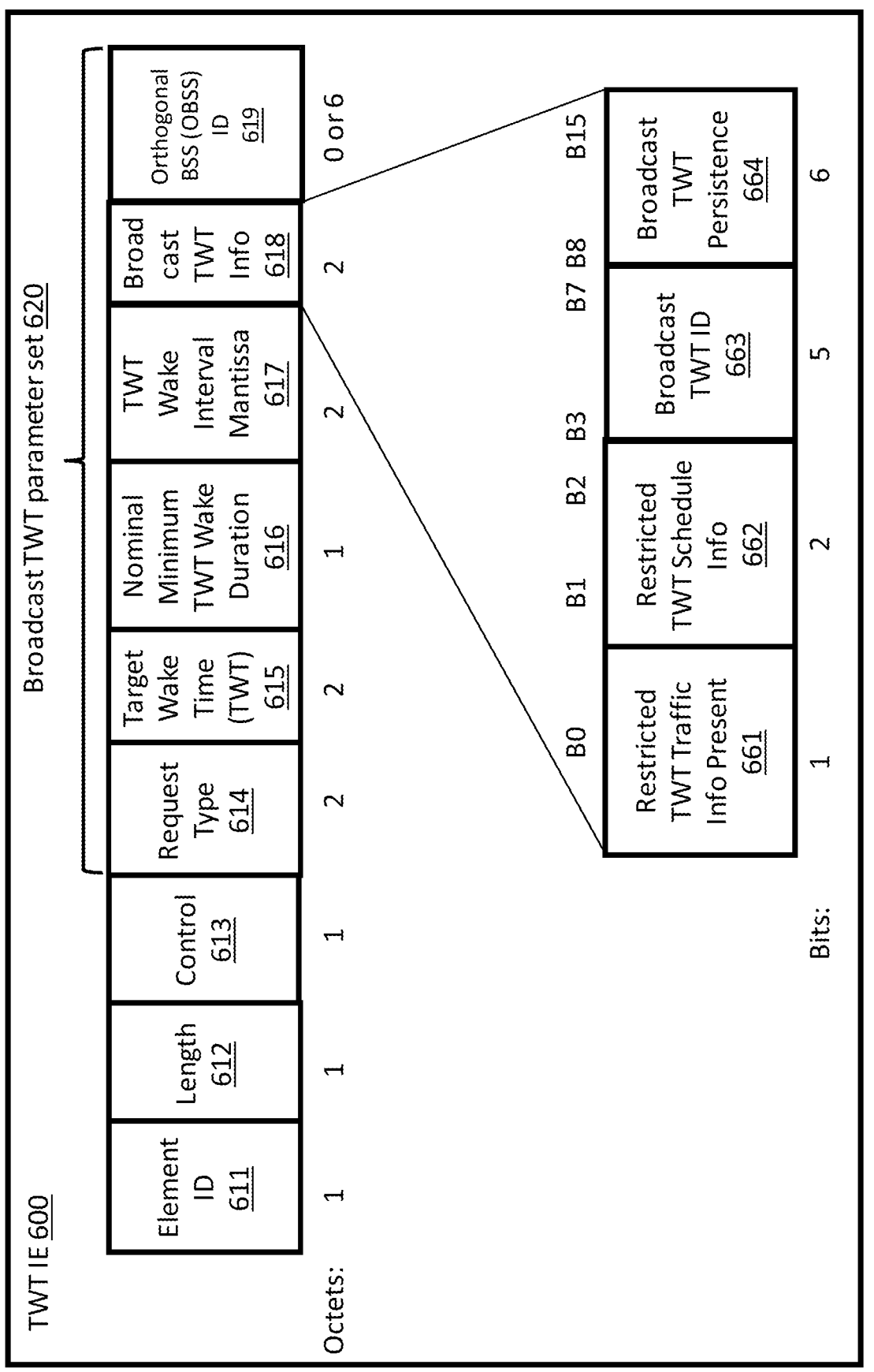
FIG. 6 is another example format of a TWT element field associated with an R-TWT schedule, according to an example implementation of the present disclosure.

FIG. 6 shows another example format of a TWT element field (or TWT IE) 600 associated with an R-TWT schedule, according to an example implementation of the present disclosure. The TWT IE 600 may include the fields of element ID 611, length 612, control 613, request type 614, target wake time 615, nominal minimum TWT wake duration 616, TWT wake interval mantissa 617, broadcast TWT information 618, and/or overlapping basic service set (OBSS) ID 619. The TWT IE 600 may include the field of broadcast TWT parameter set 620 which describes a broadcast TWT schedule and/or an R-TWT schedule. In some embodiments, the field of broadcast TWT information 618 may include the subfields of restricted TWT traffic information present 661, restricted TWT schedule information 662, broadcast TWT ID 663, and/or broadcast TWT persistence 664.

The TWT IE 600 has the same structure as the TWT IE 500 (see FIG. 5) except for the TWT IE 600 includes the field of OBSS ID 619. In some embodiments, a first device (e.g., AP) sending an advertisement frame associated with a R-TWT schedule may identify/detect/monitor the OBSS associated with the advertised TWT schedule. For example, the container carrying a restricted TWT schedule information subfield (of an advertisement frame in the OBSS) may be a PLCP Protocol Data Unit. The first device may identify an identifier of the OBSS (e.g. BSSID of the OBSS) by capturing the PLCP Protocol Data Unit and extracting a MAC header (which include BSSID of the OBSS) from the PLCP Protocol Data Unit. In some embodiments, one or more bits (e.g., OBSS ID field 619) may be added/modified in the advertisement frame to identify the OBSS. For example, the OBSS ID field 619 may be set to the BSSID of the OBSS to identify the OBSS.

Figure 7:
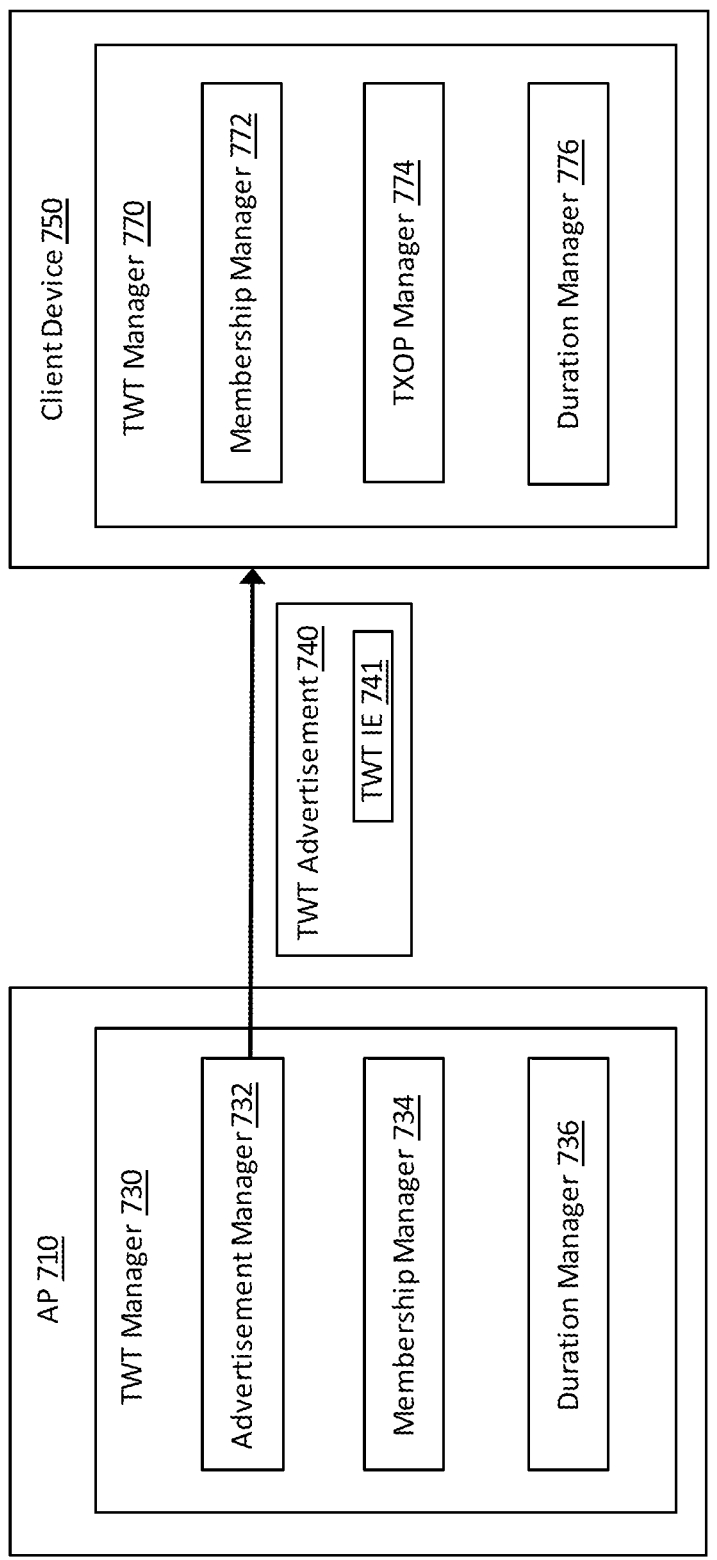
FIG. 7 is a block diagram of a system environment in which a client device and an AP communicate data relating to an R-TWT schedule, according to an example implementation of the present disclosure.

FIG. 7 is a block diagram of a system environment 700 in which an AP 710 and a client device 750 communicate data relating to an R-TWT schedule, according to an example implementation of the present disclosure. In some embodiments, the AP 710 may be an AP, a soft AP or a computing device in a WLAN. The AP 710 may include a TWT manager 730. The TWT manager 730 includes an electronic component or a combination of an electronic component and a software component. The TWT manager 730 may include an advertisement manager 732, a membership manager 734, and/or a duration manager 736. The TWT manager 730 may be configured to advertise an R-TWT schedule by indicating properties of the R-TWT schedule. The advertisement manager 732 may be configured to generate and send an advertisement frame 740. For example, the advertisement frame 740 may be a beacon frame or other management frame such as probe request/response, association/disassociation, etc.). The advertisement frame 740 may include a TWT element or TWT IE 741. For example, the TWT IE 741 may have the same structure as that of TWT IE 500 or TWT IE 600 as shown in FIG. 5 and FIG. 6. The membership manager 734 may be configured to receive a request from a STA (e.g., client device 750) for a new membership of a particular R-TWT schedule, determine whether the request is accepted or rejected/denied, and if accepted, perform TWT operations with the STA. The duration manager 736 may be configured to receive a request from a STA (e.g., client device 750) to increase a schedule duration (e.g., an SP duration or a nominal minimum TWT wake duration) of a particular R-TWT schedule, determine whether the request is accepted or rejected/denied, and if accepted, increase the schedule duration of the particular R-TWT schedule.

In some embodiments, the client device 750 may be a non-AP STA, a HWD, or a computing device. The client device 750 may include a TWT manager 770. The TWT manager 770 includes an electronic component or a combination of an electronic component and a software component. The TWT manager 770 may include a membership manager 772, a TXOP manager 774, and/or a duration manager 776. The TWT manager 770 may be configured to (1) receive an advertisement frame (e.g., advertisement frame 740) associated with a particular R-TWT schedule from the AP 710, and (2) perform various TWT operations with respect to the particular R-TWT schedule (e.g., request for a new R-TWT membership, manage timings of TXOP, request to increase a schedule duration, etc.) based on restricted TWT schedule information contained in the TWT IE of the advertisement frame (e.g., the restricted TWT schedule information subfield 562 of the TWT IE 500). The membership manager 772 may be configured to (1) determine, based on the restricted TWT schedule information of the particular R-TWT schedule contained in the advertisement frame 740, whether the client device 750 sends a request for a new membership of the particular R-TWT schedule, and (2) send the request based on the determination. The TXOP manager 774 may be configured to determine timings of TXOP (of the client device 750) based on the restricted TWT schedule information of the particular R-TWT schedule contained in the advertisement frame 740. The duration manager 776 may be configured to determine whether to send a request to increase a schedule duration, based on the restricted TWT schedule information of the particular R-TWT schedule contained in the advertisement frame 740.

Referring to FIG. 5 to FIG. 7, the AP 710 (or the advertisement manager 732) may advertise an R-TWT schedule using an advertisement frame (e.g., advertisement frame 740) by indicating whether the R-TWT schedule (or SPs thereof) is active (e.g., R-TWT schedules having at least one member STA) or not. In some embodiments, the AP 710 may advertise an R-TWT schedule to enable R-TWT supporting STAs (e.g., client device 750) to learn (be notified/informed of) the start times of SPs of active R-TWT schedules (e.g., SPs of all active R-TWT schedules set up in the BSS of the AP and the STAs). The start times of SPs may be obtained from an TWT IE (e.g., from the fields of 515, nominal minimum TWT wake duration 516 and TWT wake interval mantissa 517 of the TWT IE 500). With the knowledge/information of the start times of SPs of an active R-TWT schedule, the client device 750 (or TXOP manager 774) can stop/terminate/end its own TXOP before the start of SPs of the active R-TWT schedule. With the knowledge/information of the start times of SPs of a non-active R-TWT schedule (e.g., schedules having no member STAs), the client device 750 does not need to stop/terminate/end its own TXOP before the start of SPs of the non-active R-TWT schedule.

In some embodiments, the AP 710 may advertise a particular R-TWT schedule by indicating whether the AP 710 can accept a new membership of the particular R-TWT schedule. With the knowledge/information of whether the AP 710 can accept a new membership of a particular R-TWT schedule, the client device 750 (or membership manager 772) may request a new membership of the particular R-TWT schedule depending not only on the client device's traffic demands but also on whether the new membership is acceptable. The client device 750 may also send to a device a request for a new R-TWT schedule depending on whether the AP 710 can accept a new membership of another R-TWT schedule.

In some embodiments, the advertisement frame 740 of an R-TWT schedule may indicate whether the R-TWT schedule (or an SP thereof) is active. The R-TWT schedule may be indicated as "active" if any STAs have established membership in the R-TWT schedule; otherwise the R-TWT schedule may not be active. In some embodiments, the R-TWT schedule may not be active if membership of the R-TWT schedule is suspended (e.g., a new membership cannot be accepted). The AP 710 may advertise an R-TWT schedule without any members to invite membership. If the R-TWT schedule set up by the AP is not active (or the R-TWT schedule has no members), the client 750 which is in the same BSS as the AP 710 may not (or may determine not to, or may not need to) stop/terminate/end their TXOPs at the start boundary (or start time) of an SP of the R-TWT schedule.

In some embodiments, the value "0" of the restricted TWT schedule information subfield of the TWT IE 741 (B1=0, B2=0) in the advertisement frame 740 associated with an R-TWT schedule (and an SP thereof) may indicate that the R-TWT schedule is not active (and accordingly not full for instance). Accordingly, the client device 750 that receives the advertisement frame 740 may not have to stop/terminate/end the STA's TXOP at the start of an SP of the r-TWT schedule. In some embodiments, the value "1" of the restricted TWT schedule information subfield of the TWT IE 741 (B1=0, B2=1) in the advertisement frame 740 associated with an R-TWT schedule (and an SP thereof) may indicate that the R-TWT schedule is active but not full. Accordingly, the client device 750 that receives the advertisement frame 740 may/will/should stop/terminate/end its TXOP at the start of an SP of the r-TWT schedule. The client device 750 that receives the advertisement frame 740 may also request membership of the r-TWT schedule (or an SP thereof). The client device 750 (e.g., duration manager 776) that receives the advertisement frame 740 may request/negotiate an increase in a schedule duration (e.g., an SP duration or a nominal minimum TWT wake duration).

In some embodiments, the advertisement frame 740 of an R-TWT schedule may indicate whether the R-TWT schedule (or an SP thereof) is full. The R-TWT schedule set up by the AP 710 may be indicated as "full" if the AP 710 (or the membership manager 734) is unlikely to (or cannot) accept a request for a new membership of the R-TWT schedule. In some embodiments, the R-TWT schedule set up by the AP 710 may be indicated as "full" if the AP 710 (or the duration manager 736) is unlikely to (or cannot) accept a request from an existing member of the R-TWT schedule to increase a schedule duration (e.g., an SP duration or a nominal minimum TWT wake duration as indicated in the fields of the TWT IE 500, 600). In some embodiments, the R-TWT schedule set up by the AP 710 may be indicated as "full" if the R-TWT schedule already has been allocated enough resources and the AP 710 likely cannot accommodate more membership requests. In some embodiments, upon receiving the advertisement frame 740 of an R-TWT schedule including an indication whether the R-TWT schedule (or an SP thereof) is full, the client device 750 may determine, based on the indication, whether the R-TWT schedule (or an SP thereof) is a target for establishing membership.

In some embodiments, the value "2" of the restricted TWT schedule information subfield of the TWT IE 741 (B1=1, B2=0) in the advertisement frame 740 associated with an R-TWT schedule (and an SP thereof) may indicate that the schedule is active and full. Accordingly, the client device 750 that receives the advertisement frame 740 may/will/should stop/terminate/end its TXOP at the start of an SP of the r-TWT schedule. The client device 750 that receives the advertisement frame 740 may request membership of the r-TWT schedule (or an SP thereof) but the scheduling device (e.g., AP 710) may be unlikely to (or cannot) accept new members of the R-TWT schedule. In some embodiments, the client device 750 that receives the advertisement frame 740 may not request membership of the r-TWT schedule (or an SP thereof). The client device 750 that receives the advertisement frame 740 may request/negotiate an increase in a schedule duration (e.g., an SP duration or a nominal minimum TWT wake duration), but the AP 710 is unlikely to accept the increased minimum TWT wake duration because the AP 710 is indicating that the resources are mostly used up (e.g., allocated). In some embodiments, the client device 750 that receives the advertisement frame 740 may not request/negotiate an increase in a schedule duration.

In some embodiments, the advertisement frame 740 of an R-TWT schedule sent by the AP 710 may include an indication whether the R-TWT schedule is associated with (or set up for) an OBSS which is different from the BSS of the AP 710 and the client device 750. If there exists an OBSS in a WLAN, two or more APs or STAs installed close together and operating on the same transmission channel that have no connection to each other may interfere with each other, thereby reducing the network performance of the WLAN. Using the advertisement frame 740, the AP 710 may share R-TWT schedules across multiple BSSs to help with managing interference between BSSs for instance. The AP 710 may advertise an R-TWT schedule by indicating whether the advertised R-TWT schedule is from the device's own network/BSS or an OBSS. In some embodiments, if the advertisement of an R-TWT schedule sent by the AP 710 indicates that the R-TWT schedule is from (or associated with or set up for) an OBSS which is different from the BSS of the AP 710, the AP 710 may identify the OBSS (using a BSS identifier (BSSID) of the OBSS) in the advertisement. In some embodiments, upon receiving, from the AP 710, an advertisement frame 740 of an R-TWT schedule including an indication that the R-TWT schedule (or an SP thereof) is associated with an OBSS which is different from the AP's own BSS, the client device 750 can stop/terminate/end their TXOPs before the start of an SP of the R-TWT schedule of the OBSS, to avoid interference with transmission(s) during the SP of the R-TWT schedule.

In some embodiments, the value "3" of the restricted TWT schedule information subfield of the TWT IE 741 (B1=1, B2=1) in the advertisement frame 740 associated with a TWT schedule (and an SP thereof) and sent by the AP 710 may indicate that the schedule is active, but the TWT schedule has been setup by a second device (e.g., AP) in a neighboring BSS (e.g., OBSS). Accordingly, the client device 750 that receives this advertisement frame 740 may/will/should stop/terminate/end its TXOP at the start of an SP of the TWT schedule. In some embodiments, the AP 710 may detect the TWT schedule setup by the second device by capturing and analyzing a PLCP Protocol Data Unit carrying an advertisement frame in the OBSS.

In some embodiments, the value "3" of the restricted TWT schedule information subfield of the TWT IE 741 (B1=1, B2=1) in the advertisement frame 740 associated with an R-TWT schedule (and an SP thereof) may indicate that the R-TWT schedule is active and full, or active and not full. Accordingly, the client device 750 that receives this advertisement frame 740 may/will/should stop/terminate/end its TXOP at the start of an SP of the r-TWT schedule.

FIG. 8 is a flowchart showing a process 800 of indicating service period (SP) information for R-TWT operation for wireless communication, according to an example implementation of the present disclosure. In some embodiments, the process 800 is performed by a device (e.g., an AP 105, an AP 710, a computing device 110A, 110B, a HWD 150A, 150B). In some embodiments, the process 800 is performed by other entities. In some embodiments, the process 800 includes more, fewer, or different steps than shown in FIG. 8.

In one approach, the device (e.g., AP 710 or advertisement manager 732) may generate 802 a frame (e.g., TWT advertisement frame 740) relating to a TWT schedule. In some embodiments, the TWT schedule may be an R-TWT schedule. The device may determine 804 whether the device (e.g., AP 710 or membership manager 732) can accept a request for a new membership of the TWT schedule. In some embodiments, in response to determining that the device (e.g., AP 710 or membership manager 734) cannot accept a request for a new membership of the TWT schedule, the device may set 806 a subfield of the frame to a first value (e.g., value "2" in the restricted TWT schedule information subfield 562 according to Table 1), indicating, to a receiver device (e.g., client 750) receiving the frame, to avoid sending a request for a new membership of the TWT schedule. The device may wirelessly transmit 808, via a transmitter, the generated frame to the receiver device. In some embodiments, the receiver device (e.g., client device 750) receiving the frame may be in same basic service set (BSS) as the device (e.g., AP 710).

In some embodiments, the device (e.g., AP 710 or TWT manager 730) may determine whether the device can allocate one or more resources for a new membership to the TWT schedule. In response to determining that the device cannot allocate one or more resources for a new membership to the TWT schedule, the device may determine that the device (e.g., AP 710 or membership manager 734) cannot accept a request for a new membership of the TWT schedule.

In some embodiments, the device (e.g., AP 710 or duration manager 736) may determine whether the device can accept a request for increasing a duration of a service period (SP) of the TWT schedule. In response to determining that the device cannot accept a request for increasing the duration of the SP of the TWT schedule, the device may set the subfield of the frame to the first value (e.g., value "2" in the restricted TWT schedule information subfield 562 according to Table 1), indicating, to the receiver device receiving the frame, to avoid sending a request for increasing the duration of the SP of the TWT schedule.

In some embodiments, the device (e.g., AP 710 or membership manager 734) may determine whether there is at least one wireless device having a membership of the TWT schedule. In response to determining that there is at least one wireless device having a membership of the TWT schedule, the device may set the subfield of the frame to a second value (e.g., value "1" in the restricted TWT schedule information subfield 562 according to Table 1), indicating, to the receiver device receiving the frame, to end a TXOP duration before a start time of a service period (SP) of the TWT schedule. In response to determining that there is no wireless device having a membership of the TWT schedule, the device may set the subfield of the frame to a third value (e.g., value "0" in the restricted TWT schedule information subfield 562 according to Table 1).

In some embodiments, the device (e.g., AP 710 or TWT manager 730) may determine whether there exists another TWT schedule set up for an overlapping basic service set (OBS S) which is different from a BSS of the device. In response to determining that there exists another TWT schedule set up for the OBSS, the device may set the subfield of the frame to a fourth value (e.g., value "3" in the restricted TWT schedule information subfield 562 according to Table 1), indicating, to the receiver device receiving the frame, to end a TXOP duration before a start time of an SP of the another TWT schedule. There may be at least one wireless device having a membership of the another TWT schedule. In response to determining that there exists another TWT schedule set up for the OBSS, the device may set another subfield of the frame (e.g., OBSS ID subfield 619) to an identifier of the OBSS (e.g., BSSID of the OBSS).

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   one or more processors configured to:
   generate a frame relating to a target wake time (TWT) schedule;
   determine that the device cannot allocate one or more resources for a new membership of the TWT schedule;
   determine that the device cannot accept a request for the new membership of the TWT schedule;
   set a subfield of the frame to a first value, indicating, to a receiver device receiving the frame, to avoid sending a request for the new membership of the TWT schedule; and
   wirelessly transmit, via a transmitter, the generated frame to the receiver device.

2. The device according to claim 1, wherein the TWT schedule is a restricted TWT (R-TWT) schedule.

3. The device according to claim 1, wherein the receiver device receiving the frame is in same basic service set (BSS) as the device.

4. The device according to claim 1, wherein the one or more processors are configured to:
   determine whether the device can accept a request for increasing a duration of a service period (SP) of the TWT schedule; and
   in response to determining that the device cannot accept a request for increasing the duration of the SP of the TWT schedule, set the subfield of the frame to the first value, indicating, to the receiver device receiving the frame, to avoid sending a request for increasing the duration of the SP of the TWT schedule.

5. The device according to claim 1, wherein the one or more processors are configured to:

determine whether there is at least one wireless device having a membership of the TWT schedule; and in response to determining that there is at least one wireless device having a membership of the TWT schedule, set the subfield of the frame to a second value, indicating, to the receiver device receiving the frame, to end a Transmit Opportunity (TXOP) duration before a start time of a service period (SP) of the TWT schedule.

6. The device according to claim 5, wherein the one or more processors are configured to:

in response to determining that there is no wireless device having a membership of the TWT schedule, set the subfield of the frame to a third value.

7. A device comprising:

one or more processors configured to:

generate a frame relating to a target wake time (TWT) schedule;

determine whether the device can accept a request for a new membership of the TWT schedule;

in response to determining that the device cannot accept a request for the new membership of the TWT schedule, set a subfield of the frame to a first value, indicating, to a receiver device receiving the frame, to avoid sending a request for the new membership of the TWT schedule;

determine whether there exists another TWT schedule set up for an overlapping basic service set (OBSS) which is different from a BSS of the device;

in response to determining that there exists another TWT schedule set up for the OBSS, set the subfield of the frame to a second value, indicating, to the receiver device receiving the frame, to end a Transmit Opportunity (TXOP) duration before a start time of a service period (SP) of the another TWT schedule; and wirelessly transmit, via a transmitter, the generated frame to the receiver device.

8. The device according to claim 7, wherein there is at least one wireless device having a membership of the another TWT schedule.

9. The device according to claim 7, wherein the one or more processors are configured to:

in response to determining that there exists another TWT schedule set up for the OBSS, set another subfield of the frame to an identifier of the OBSS.

10. A method comprising:

generating, by one or more processors of a device, a frame relating to a target wake time (TWT) schedule;

determining, by the one or more processors, that the device cannot allocate one or more resources for a new membership of the TWT schedule;

determining, by the one or more processors, that the device cannot accept a request for the new membership of the TWT schedule;

setting, by the one or more processors, a subfield of the frame to a first value, indicating, to a receiver device receiving the frame, to avoid sending a request for the new membership of the TWT schedule; and wirelessly transmitting, via a transmitter, the generated frame to the receiver device.

11. The method according to claim 10, wherein the TWT schedule is a restricted TWT (R-TWT) schedule.

12. The method according to claim 10, wherein the receiver device receiving the frame is in same basic service set (BSS) as the device.

13. The method according to claim 10, further comprising:

determining whether the device can accept a request for increasing a duration of a service period (SP) of the TWT schedule; and in response to determining that the device cannot accept a request for increasing the duration of the SP of the TWT schedule, setting the subfield of the frame to the first value, indicating, to the receiver device receiving the frame, to avoid sending a request for increasing the duration of the SP of the TWT schedule.

14. The method according to claim 10, further comprising:

determining whether there is at least one wireless device having a membership of the TWT schedule; and in response to determining that there is at least one wireless device having a membership of the TWT schedule, setting the subfield of the frame to a second value, indicating, to the receiver device receiving the frame, to end a Transmit Opportunity (TXOP) duration before a start time of a service period (SP) of the TWT schedule.

15. The method according to claim 14, further comprising:

in response to determining that there is no wireless device having a membership of the TWT schedule, setting the subfield of the frame to a third value.

16. The method according to claim 10, further comprising:

determining whether there exists another TWT schedule set up for an overlapping basic service set (OBSS) which is different from a BSS of the device; and in response to determining that there exists another TWT schedule set up for the OBSS, setting the subfield of the frame to a fourth value, indicating, to the receiver device receiving the frame, to end a Transmit Opportunity (TXOP) duration before a start time of a service period (SP) of the another TWT schedule.

17. The method according to claim 16, wherein there is at least one wireless device having a membership of the another TWT schedule.

18. The method according to claim 16, further comprising:

in response to determining that there exists another TWT schedule set up for the OBSS, setting another subfield of the frame to an identifier of the OBSS.

\* \* \* \* \*